(12) United States Patent
Zhang et al.

(10) Patent No.: US 12,174,456 B2
(45) Date of Patent: Dec. 24, 2024

(54) OPTICAL IMAGING LENS

(71) Applicant: Zhejiang Sunny Optics Co., Ltd, Yuyao (CN)

(72) Inventors: Shuang Zhang, Yuyao (CN); Saifeng Lyu, Yuyao (CN); Xiaobin Zhang, Yuyao (CN); Fujian Dai, Yuyao (CN); Liefeng Zhao, Yuyao (CN)

(73) Assignee: Zhejiang Sunny Optics Co., Ltd (CN)

(*) Notice: Subject to any disclaimer, the term of this patent is extended or adjusted under 35 U.S.C. 154(b) by 500 days.

(21) Appl. No.: 17/592,302

(22) Filed: Feb. 3, 2022

(65) Prior Publication Data

US 2022/0155559 A1  May 19, 2022

Related U.S. Application Data

(63) Continuation of application No. PCT/CN2020/101982, filed on Jul. 15, 2020.

(30) Foreign Application Priority Data

Aug. 27, 2019 (CN) .......................... 201910796812.4

(51) Int. Cl.
*G02B 9/60* (2006.01)
*G02B 13/00* (2006.01)
(52) U.S. Cl.
CPC ........... *G02B 9/60* (2013.01); *G02B 13/0045* (2013.01)
(58) Field of Classification Search
CPC ......... G02B 9/60; G02B 9/62; G02B 13/0045
See application file for complete search history.

(56) References Cited

U.S. PATENT DOCUMENTS

| | | | |
|---|---|---|---|
| 2013/0271642 A1 | 10/2013 | Sano | |
| 2014/0111874 A1* | 4/2014 | Chae | G02B 13/0045 359/714 |
| 2017/0139187 A1* | 5/2017 | Shih | G02B 13/0045 |

(Continued)

FOREIGN PATENT DOCUMENTS

| | | |
|---|---|---|
| CN | 103592743 A | 2/2014 |
| CN | 203773141 U | 8/2014 |

(Continued)

OTHER PUBLICATIONS

International Search Report for application PCT/CN2020/101982, 4 pages.

*Primary Examiner* — Christopher Stanford
*Assistant Examiner* — Journey F Sumlar
(74) *Attorney, Agent, or Firm* — Barnes & Thornburg LLP

(57) ABSTRACT

Disclosed in the present application is an optical imaging lens. The optical imaging lens sequentially comprises, along an optical axis from an object side to an image side: a first lens having positive focal power; a second lens having focal power; a third lens having focal power; a fourth lens having positive focal power, an object side surface of the fourth lens being a convex surface and an image side surface thereof being a concave surface; and a fifth lens having negative focal power, an object side surface of the fifth lens being a convex surface and an image side surface thereof being a concave surface. A combined focal length f12 of the first lens and the second lens and a combined focal length f123 of the first lens, the second lens, and the third lens satisfy a relation that $0.5 < f12/f123 < 1.5$.

20 Claims, 9 Drawing Sheets

(56) References Cited

U.S. PATENT DOCUMENTS

| | | | |
|---|---|---|---|
| 2017/0235109 A1* | 8/2017 | Shin | G02B 9/62 |
| | | | 359/708 |
| 2018/0113281 A1 | 4/2018 | Tsai et al. | |
| 2018/0231742 A1* | 8/2018 | Jung | G02B 13/0045 |

FOREIGN PATENT DOCUMENTS

| | | |
|---|---|---|
| CN | 104395806 A | 3/2015 |
| CN | 107167900 A | 9/2017 |
| CN | 107290843 A | 10/2017 |
| CN | 206684372 U | 11/2017 |
| CN | 109298516 A | 2/2019 |
| CN | 208984870 U | 6/2019 |
| CN | 209265059 U | 8/2019 |
| CN | 110488467 A | 11/2019 |
| CN | 211086749 U | 7/2020 |
| CN | 114236751 A | 3/2022 |
| JP | 2013174741 A | 9/2013 |
| JP | 2015084066 A | 4/2015 |

\* cited by examiner

OPTICAL IMAGING LENS

CROSS-REFERENCE TO RELATED APPLICATIONS

This application is a continuation of International Application No. PCT/CN2020/101982, filed on Jul. 15, 2020, which claims the priority and right to Chinese Patent Application No. 201910796812.4 filed on Aug. 27, 2019 before the China National Intellectual Property Administration (CNIPA). Both of the aforementioned applications are hereby incorporated by reference in their entireties.

TECHNICAL FIELD

The present disclosure relates to the field of optical elements, and specifically to an optical imaging lens assembly.

BACKGROUND

With the advancement of science and technology, electronic products have developed rapidly. In particular, electronic products having a camera function are more favored by the market, such as, portable camera devices. At the same time, with the continuous promotion and application of camera devices, the requirements for the imaging qualities of the camera devices have become higher and higher in the market. Here, the performance of optical imaging lens assemblies is a key factor affecting the imaging qualities of the camera devices. Therefore, there is a need for optical imaging lens assemblies having high imaging qualities, to meet market demands.

SUMMARY

In an aspect of the present disclosure, an optical imaging lens assembly is provided, and the optical imaging lens assembly includes, sequentially along an optical axis from an object side to an image side: a first lens having a positive refractive power; a second lens having a refractive power; a third lens having a refractive power; a fourth lens having a positive refractive power, where an object-side surface of the fourth lens is a convex surface, and an image-side surface of the fourth lens is a convex surface; and a fifth lens having a negative refractive power, where an object-side surface of the fifth lens is a convex surface, and an image-side surface of the fifth lens is a concave surface.

In an implementation, a combined focal length f12 of the first lens and the second lens and a combined focal length f123 of the first lens, the second lens and the third lens satisfy: $0.5 < f12/f123 < 1.5$.

In an implementation, a distance TTL from an object-side surface of the first lens to an image plane of the optical imaging lens assembly on the optical axis and a half of a diagonal length ImgH of an effective pixel area on the image plane of the optical imaging lens assembly satisfy: $TTL/ImgH \leq 1.3$.

In an implementation, a center thickness CT4 of the fourth lens on the optical axis and a spaced interval T34 between the third lens and the fourth lens on the optical axis satisfy: $CT4/T34 > 1.2$.

In an implementation, a radius of curvature R1 of an object-side surface of the first lens and an effective focal length f1 of the first lens satisfy: $0.2 < R1/f1 < 0.6$.

In an implementation, an axial distance SAG41 from an intersection point of the object-side surface of the fourth lens and the optical axis to a vertex of an effective radius of the object-side surface of the fourth lens and an axial distance SAG51 from an intersection point of the object-side surface of the fifth lens and the optical axis to a vertex of an effective radius of the object-side surface of the fifth lens satisfy: $0.2 < SAG41/SAG51 < 0.8$.

In an implementation, a total effective focal length f of the optical imaging lens assembly, an effective focal length f4 of the fourth lens and an effective focal length f5 of the fifth lens satisfy: $1.8 < |f/f4| + |f/f5| < 2.8$.

In an implementation, a radius of curvature R9 of the object-side surface of the fifth lens and a radius of curvature R10 of the image-side surface of the fifth lens satisfy: $1.0 < (R9+R10)/(R9-R10) < 2.2$.

In an implementation, an entrance pupil diameter EPD of the optical imaging lens assembly and a sum $\Sigma CT$ of center thicknesses of the first lens to the fifth lens on the optical axis satisfy: $0.3 < EPD/\Sigma CT < 0.9$.

In an implementation, a maximal effective radius DT11 of an object-side surface of the first lens and a maximal effective radius DT12 of an image-side surface of the first lens satisfy: $0.7 < DT11/DT12 < 1.4$.

In an implementation, a half of a maximal field-of-view Semi-FOV of the optical imaging lens assembly and a center thickness CT5 of the fifth lens on the optical axis satisfy: $2.0 \text{ mm}^{-1} < \tan(\text{Semi-FOV})/CT5 < 3.5 \text{ mm}^{-1}$.

In an implementation, a sum $\Sigma AT$ of spaced intervals between any two adjacent lenses in the first lens to the fifth lens on the optical axis and a spaced interval TD between an object-side surface of the first lens and the image-side surface of the fifth lens on the optical axis satisfy: $0.1 < \Sigma AT/TD < 0.6$.

In an implementation, a center thickness CT2 of the second lens on the optical axis, a center thickness CT3 of the third lens on the optical axis, a spaced interval T12 between the first lens and the second lens on the optical axis and a spaced interval T23 between the second lens and the third lens on the optical axis satisfy: $1.5 < (CT2+CT3)/(T12+T23) < 2.5$.

BRIEF DESCRIPTION OF THE DRAWINGS

In combination with the accompanying drawings, other features, objectives and advantages of the present disclosure will become more apparent through the following detailed description of non-limiting implementations. In the accompanying drawings.

DETAILED DESCRIPTION OF EMBODIMENTS

Figure 1:
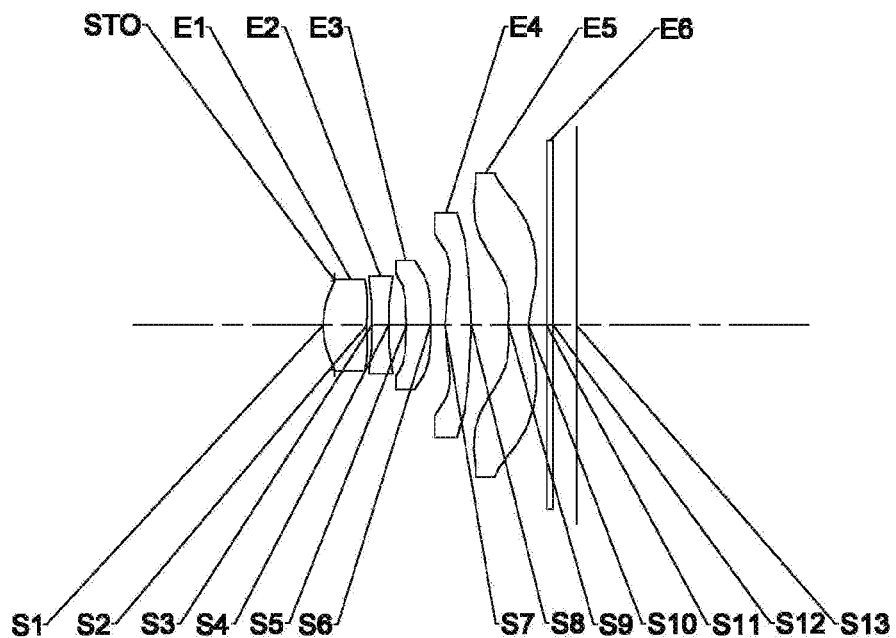
FIG. 1 is a schematic structural diagram of an optical imaging lens assembly according to Example 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a paraxial area refers to an area near an optical axis. If a lens surface is a convex surface and the position of the convex surface is not defined, it represents that the lens surface is a convex surface at least in the paraxial area. If the lens surface is a concave surface and the position of the concave surface is not defined, it represents that the lens surface is a concave surface at least in the paraxial area. In each lens, a surface closest to a photographed object is referred to as the object-side surface of the lens, and a surface closest to an image plane is referred to as the image-side surface of the lens.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having a meaning that is consistent with their meaning in the context of the relevant art and will not be interpreted in an idealized or overly formal sense unless expressly so defined herein.

It should be noted that the examples in the present disclosure and the features in the examples may be combined with each other on a non-conflict basis. The present disclosure will be described below in detail with reference to the accompanying drawings and in combination with the examples.

Features, principles and other aspects of the present disclosure are described below in detail.

In order to meet the market demands, the present disclosure provides a miniaturized optical imaging lens assembly having a high imaging quality.

An optical imaging lens assembly according to exemplary implementations of the present disclosure may include five lenses (i.e., a first lens, a second lens, a third lens, a fourth lens and a fifth lens) having refractive powers. The five lenses are arranged sequentially along an optical axis from an object side to an image side.

In the exemplary implementations, the first lens may have a positive refractive power. The second lens may have a refractive power. The third lens may have a refractive power. The fourth lens may have a positive refractive power, an object-side surface of the fourth lens is a convex surface, and an image-side surface of the fourth lens is a convex surface. The fifth lens may have a negative refractive power, an object-side surface of the fifth lens is a convex surface, and an image-side surface of the fifth lens is a concave surface. In this way, by reasonably configuring the refractive powers and surface types of the lenses, it may be implemented that the deflection angle of the incident light in the optical imaging lens assembly may be reduced under the premise of ensuring the high imaging quality of the optical imaging lens assembly, thereby reducing the tolerance sensitivity of the lens assembly.

In the exemplary implementations, an object-side surface of the first lens may be a convex surface, and an image-side surface of the first lens may be a concave surface.

In the exemplary implementations, the second lens may have a negative refractive power.

In the exemplary implementations, an image-side surface of the second lens may be a concave surface.

In the exemplary implementations, the ratio of an axial distance from the object-side surface of the first lens to an image plane of the optical imaging lens assembly to a half of a diagonal length of an effective pixel area on the image plane of the optical imaging lens assembly is less than or equal to 1.3. In this way, the size of the lens assembly can be effectively reduced, such that the structure of the optical imaging lens assembly becomes more compact, and the same time, the imaging space of the optical system is increased.

In the exemplary implementations, the ratio of a center thickness of the fourth lens on the optical axis to a spaced interval between the third lens and the fourth lens on the optical axis is greater than 1.2. In this way, the field curvature of the optical system can be effectively corrected, thus reducing the chromatic aberration.

In the exemplary implementations, a radius of curvature R1 of the object-side surface of the first lens and an effective focal length f1 of the first lens satisfy: 0.2<R1/f1<0.6, and preferably satisfy: 0.40<R1/f1<0.55. The proportional relationship between the radius of curvature of the object-side surface of the first lens and the effective focal length of the first lens is reasonably set, such that the surface type of the first lens changes gently, which is not only conducive to reducing the sensitivity of the first lens, but also to reducing the difficulty of the processability of the optical imaging lens assembly, thereby improving the production yield of the optical imaging lens assembly. At the same time, the above setting in the implementations may further reduce the risk of a ghost image produced by the edge field-of-view in the first lens.

In the exemplary implementations, a combined focal length f12 of the first lens and the second lens and a combined focal length f123 of the first lens, the second lens and the third lens satisfy: 0.5<f12/f123<1.5. The proportional relationship between the combined focal length of the first lens and the second lens and the combined focal length of the first lens, the second lens and the third lens is reasonably set, which not only is conducive to correcting the chromatic aberration and field curvature of the optical system, but also makes the deflection of the light incident into the optical imaging lens assembly gentle, thereby contributing to reducing the difficulty of the processability of the optical imaging lens assembly and improving the stability of the optical imaging lens assembly during post-processing.

In the exemplary implementations, a total effective focal length f of the optical imaging lens assembly, an effective focal length f4 of the fourth lens and an effective focal length f5 of the fifth lens satisfy: 1.8<|f/f4|+|f/f5|<2.8, and preferably satisfy: 2.0<|f/f4|+|f/f5|<2.4. By reasonably distributing the effective focal lengths of the fourth lens and the fifth lens, the aberration of the optical system can be effectively corrected, and the field curvature of the optical system can be balanced.

In the exemplary implementations, a radius of curvature R9 of the object-side surface of the fifth lens and a radius of curvature R10 of the image-side surface of the fifth lens satisfy: 1.0<(R9+R10)/(R9−R10)<2.2, and preferably satisfy: 1.0<(R9+R10)/(R9−R10)<2.0. The radius of curvature of the object-side surface of the fifth lens and the radius of curvature of the image-side surface of the fifth lens are reasonably set, which is not only conducive to reducing the deflection angle of the light, but also to balancing the aberration of the system, thereby improving the imaging quality of the optical imaging lens assembly.

In the exemplary implementations, an axial distance SAG41 from an intersection point of the object-side surface of the fourth lens and the optical axis to a vertex of an effective radius of the object-side surface of the fourth lens and an axial distance SAG51 from an intersection point of the object-side surface of the fifth lens and the optical axis to a vertex of an effective radius of the object-side surface of the fifth lens satisfy: 0.2<SAG41/SAG51<0.8. The ratio of the axial distance from the intersection point of the object-side surface of the fourth lens and the optical axis to the vertex of the effective radius of the object-side surface of the fourth lens to the axial distance from the intersection point of the object-side surface of the fifth lens and the optical axis to the vertex of the effective radius of the object-side surface of the fifth lens is set within a reasonable value range, which is conducive to controlling the transmission angle of the chief ray, thereby improving the matching between the optical imaging lens assembly and the chip.

In the exemplary implementations, an entrance pupil diameter EPD of the optical imaging lens assembly and a sum $\Sigma CT$ of center thicknesses of the first lens to the fifth lens on the optical axis satisfy: $0.3<EPD/\Sigma CT<0.9$, and preferably satisfy: $0.65<EPD/\Sigma CT<0.75$. The center thicknesses of the lenses are reasonably set, and the ratio of the entrance pupil diameter of the optical imaging lens assembly to the sum of the center thicknesses of the lenses is controlled within a reasonable value range, which is conducive to increasing the aperture of the system, thereby increasing the amount of light entering the optical imaging lens assembly and improving the imaging quality of the optical imaging lens assembly.

In the exemplary implementations, a maximal effective radius DT11 of the object-side surface of the first lens and a maximal effective radius DT12 of the image-side surface of the first lens satisfy: 0.7<DT11/DT12<1.4, and preferably satisfy: 0.9<DT11/DT12<1.1. The proportional relationship between the maximal effective radius of the object-side surface of the first lens and the maximal effective radius of the image-side surface of the first lens is reasonably set, which is conducive to reducing the size of the front end of the optical imaging lens assembly to obtain a miniaturization effect of the front end of the lens assembly.

In the exemplary implementations, a half of a maximal field-of-view Semi-FOV of the optical imaging lens assembly and a center thickness CT5 of the fifth lens on the optical axis satisfy: $2.0 \text{ mm}^{-1}<\tan(\text{Semi-FOV})/CT5<3.5 \text{ mm}^{-1}$, and preferably satisfy: $2.2 \text{ mm}^{-1}<\tan(\text{Semi-FOV})/CT5<3.1 \text{ mm}^{-1}$. The relationship between the half of the maximal field-of-view of the optical imaging lens assembly and the center thickness of the fifth lens on the optical axis is reasonably set, which is conducive to reducing the TV distortion of the optical imaging lens assembly, such that the fifth lens has a good manufacturability.

In the exemplary implementations, a sum $\Sigma AT$ of spaced intervals between any two adjacent lenses in the first lens to the fifth lens on the optical axis and a spaced interval TD between the object-side surface of the first lens and the image-side surface of the fifth lens on the optical axis satisfy: $0.1<\Sigma AT/TD<0.6$. The ratio of the sum of the spaced intervals between the any two adjacent lenses in the first lens to the fifth lens on the optical axis to the spaced interval between the object-side surface of the first lens and the image-side surface of the fifth lens on the optical axis is set within a reasonable value range, which is not only conducive to reducing the total track length of the optical imaging lens assembly, but also to reducing the distortion of the optical imaging lens assembly, thereby improving the imaging quality.

In the exemplary implementations, a center thickness CT2 of the second lens on the optical axis, a center thickness CT3 of the third lens on the optical axis, a spaced interval T12 between the first lens and the second lens on the optical axis and a spaced interval T23 between the second lens and the third lens on the optical axis satisfy: 1.5<(CT2+CT3)/(T12+

T23)<2.5, and preferably satisfy: 1.8<(CT2+CT3)/(T12+T23)<2.3. The relationship among the center thickness CT2, the center thickness CT3, the spaced interval T12 and the spaced interval T23 is reasonably set, which can make the corresponding lenses have a good manufacturability, and which is conducive to balancing the chromatic aberration of the optical imaging lens assembly, thereby improving the imaging quality of the optical imaging lens assembly.

In the exemplary implementations, the above optical imaging lens assembly may further include a diaphragm. The diaphragm may be disposed at an appropriate position as required. For example, the diaphragm is disposed at a position between the object side and the first lens and near the object-side surface of the first lens. Alternatively, the above optical imaging lens assembly may further include an optical filter for correcting color deviations and/or a protective glass for protecting a photosensitive element on the image plane.

In the exemplary implementations, the object-side surfaces and image-side surfaces of all the lenses in the optical imaging lens assembly of the present disclosure are alternatively aspheric surfaces. An aspheric lens is characterized in that the curvature continuously changes from the center of the lens to the periphery of the lens. Different from a spherical lens having a constant curvature from the center of the lens to the periphery of lens, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality.

In the exemplary implementations of the present disclosure, a camera apparatus is further provided, the camera apparatus including the optical imaging lens assembly described above.

In the exemplary implementations of the present disclosure, an electronic device is further provided, the electronic device including the camera apparatus described above.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having five lenses is described as an example in the implementations, the optical imaging lens assembly is not limited to including the five lenses. If desired, the optical imaging lens assembly may alternatively include other numbers of lenses.

Specific examples of the optical imaging lens assembly that may be applied to the above implementations are further described below with reference to the accompanying drawings.

Example 1

An optical imaging lens assembly according to Example 1 of the present disclosure is described below with reference to FIGS. 1-2D. FIG. 1 is a schematic structural diagram of the optical imaging lens assembly according to Example 1 of the present disclosure.

As shown in FIG. 1, the optical imaging lens assembly includes, sequentially along an optical axis from an object side to an image side, a diaphragm STO, a first lens E1, a second lens E2, a third lens E3, a fourth lens E4, a fifth lens E5, an optical filter E6 and an image plane S13.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a concave surface, and an image-side surface S4 of the second lens E2 is a concave surface. The third lens E3 has a negative refractive power, an object-side surface S5 of the third lens E3 is a concave surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The optical filter E6 has an object-side surface S11 and an image-side surface S12. Light from an object sequentially passes through the surfaces S1-S12 and finally forms an image on the image plane S13.

Table 1 is a table showing basic parameters of the optical imaging lens assembly in Example 1. Here, the units of a radius of curvature, a thickness/distance and a focal length are millimeters (mm).

TABLE 1

| surface number | surface type | radius of curvature | thickness/ distance | material refractive index | abbe number | focal length | conic coefficient |
|---|---|---|---|---|---|---|---|
| OBJ | spherical | infinite | 315.0000 | | | | |
| STO | spherical | infinite | −0.1721 | | | | |
| S1 | aspheric | 1.3410 | 0.6603 | 1.55 | 56.1 | 2.83 | −0.9610 |
| S2 | aspheric | 8.3193 | 0.0735 | | | | −64.2247 |
| S3 | aspheric | −24.7758 | 0.2553 | 1.68 | 19.2 | −8.72 | −99.0000 |
| S4 | aspheric | 7.7910 | 0.2683 | | | | −41.2256 |
| S5 | aspheric | −8.2857 | 0.3625 | 1.55 | 56.1 | −7.97 | 93.8655 |
| S6 | aspheric | 9.2975 | 0.2198 | | | | 21.4224 |
| S7 | aspheric | 2.0534 | 0.3967 | 1.55 | 56.1 | 2.99 | −4.1554 |
| S8 | aspheric | −7.4400 | 0.5614 | | | | −20.0663 |
| S9 | aspheric | 2.7793 | 0.3030 | 1.54 | 55.9 | −2.58 | −99.0000 |
| S10 | aspheric | 0.8886 | 0.2738 | | | | −8.2873 |
| S11 | spherical | infinite | 0.0976 | 1.52 | 64.2 | | |
| S12 | spherical | infinite | 0.3478 | | | | |
| S13 | spherical | infinite | | | | | |

In this example, a total effective focal length of the optical imaging lens assembly is f=3.22 mm, and a distance from the object-side surface S1 of the first lens E1 to the image plane S13 on the optical axis is TTL=3.82 mm. A half of a diagonal length of an effective pixel area on the image plane S13 is ImgH=3.01 mm. A half of a maximal field-of-view of the optical imaging lens assembly is Semi-FOV=42.1°, and a f-number of the optical imaging lens assembly is Fno=2.40.

In Example 1, the object-side surface and the image-side surface of any lens in the first to fifth lenses E1-E5 are both aspheric surfaces, and the surface type x of each aspheric lens may be defined using, but not limited to, the following formula:

$$x = \frac{ch^2}{1 + \sqrt{1-(k+1)c^2h^2}} + \sum A_i h^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and Ai is the correction coefficient of an i-th order of the aspheric surface. Table 2 below shows the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S10 in Example 1.

Example 2

Figure 3:
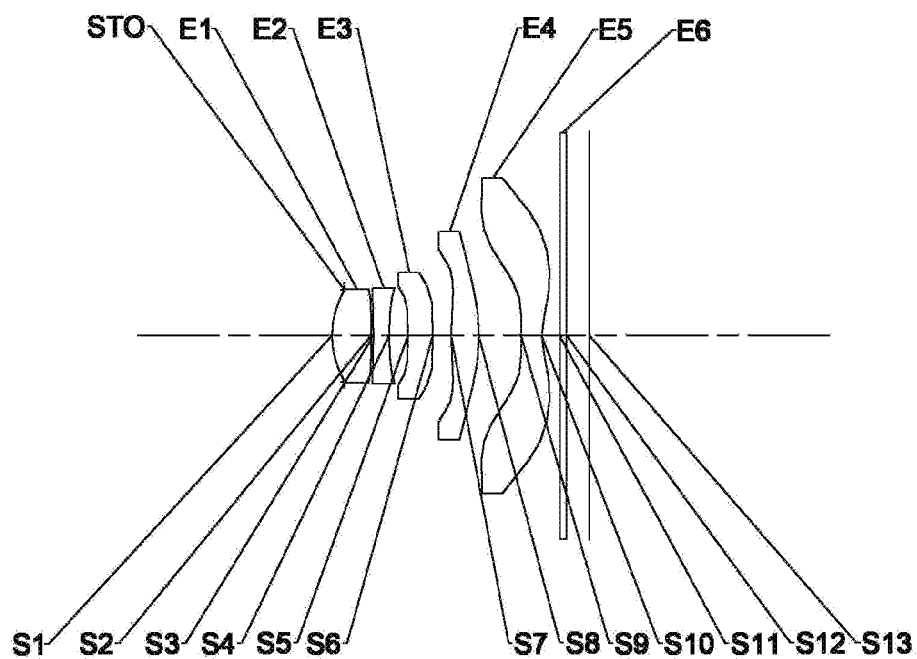
FIG. 3 is a schematic structural diagram of an optical imaging lens assembly according to Example Example 2 of the present disclosure.

An optical imaging lens assembly according to Example 2 of the present disclosure is described below with reference to FIGS. 3-4D. FIG. 3 is a schematic structural diagram of the optical imaging lens assembly according to Example 2 of the present disclosure.

As shown in FIG. 3, the optical imaging lens assembly includes, sequentially along an optical axis from an object side to an image side, a diaphragm STO, a first lens E1, a second lens E2, a third lens E3, a fourth lens E4, a fifth lens E5, an optical filter E6 and an image plane S13.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a concave surface, and an image-side surface S4 of the second lens E2 is a concave surface. The third lens E3 has a negative refractive power, an object-side surface S5 of the third lens E3 is a concave surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The optical filter E6 has an object-side surface S11 and an

TABLE 2

| surface number | A4 | A6 | A8 | A10 | A12 | A14 | A16 | A18 | A20 |
|---|---|---|---|---|---|---|---|---|---|
| S1 | 9.4697E−03 | 7.3276E−01 | −8.7417E+00 | 6.3048E+01 | −2.8727E+02 | 8.2945E+02 | −1.4742E+03 | 1.4715E+03 | −6.3202E+02 |
| S2 | −1.7180E−01 | 4.6423E−01 | −6.6597E+00 | 3.6167E+01 | −1.2422E+02 | 2.6903E+02 | −3.3593E+02 | 2.0187E+02 | −3.2062E+01 |
| S3 | −1.2062E−01 | −5.6346E−01 | −2.6964E−01 | −4.4050E+00 | 3.2473E+01 | −9.5075E+01 | 1.5379E+02 | −1.3530E+02 | 5.1485E+01 |
| S4 | 8.7773E−03 | 5.0275E−01 | −3.7958E+00 | 2.3115E+01 | −9.5177E+01 | 2.5470E+02 | −4.1651E+02 | 3.7590E+02 | −1.4264E+02 |
| S5 | −3.9843E−01 | 1.1200E+00 | 4.3889E+00 | 1.0909E+01 | −1.7367E+01 | 1.5968E+01 | −1.1486E+01 | 1.2176E+01 | −7.7944E+00 |
| S6 | −7.2727E−01 | 1.8245E+00 | −6.7073E+00 | 2.0173E+01 | −4.4493E+01 | 6.6730E+01 | −6.3569E+01 | 3.4482E+01 | −8.0119E+00 |
| S7 | −3.1085E−01 | 5.7273E−01 | −8.9318E−01 | 8.2858E−01 | −4.7004E−01 | 1.1621E−01 | 1.4750E−02 | −1.0798E−02 | 8.2785E−04 |
| S8 | −8.8870E−02 | 2.8784E−01 | −3.4056E−01 | 2.2843E−01 | −1.2463E−01 | 6.2519E−02 | −2.2783E−02 | 4.6695E−03 | −3.9374E−04 |
| S9 | −8.1885E−01 | 8.9071E−01 | −5.9769E−01 | 2.9380E−01 | −1.0350E−01 | 2.4708E−02 | −3.7460E−03 | 3.2398E−04 | −1.2151E−05 |
| S10 | −3.3189E−01 | 3.0978E−01 | −1.9846E−01 | 8.6865E−02 | −2.5564E−02 | 4.7945E−03 | −5.2597E−04 | 2.8815E−05 | −5.1090E−07 |

Figures 2A, 2B:
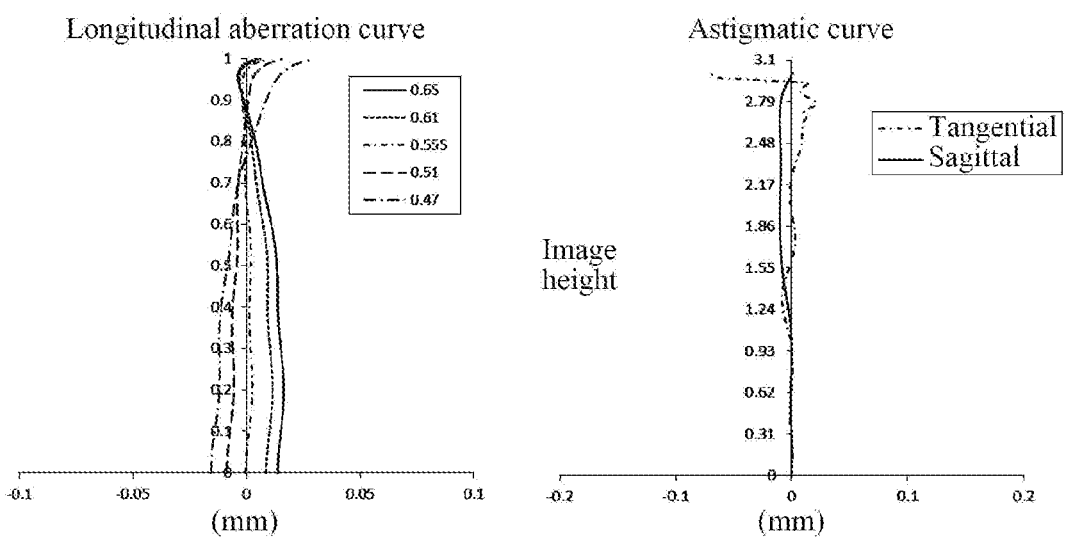
FIGS. 2A-2D respectively illustrate a longitudinal aberration curve, an astigmatic curve, a distortion curve and a lateral color curve of the optical imaging lens assembly according to Example 1.
Figure 2C:
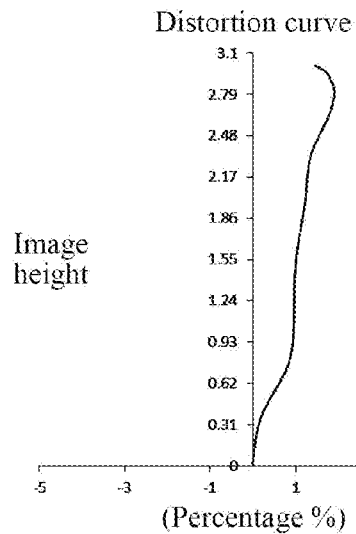
Figure 2D:
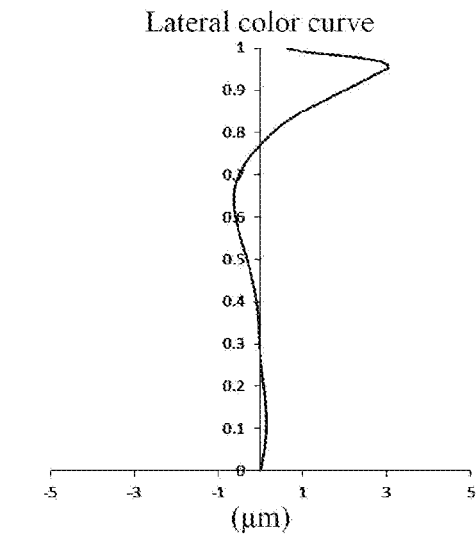

FIG. 2A illustrates a longitudinal aberration curve of the optical imaging lens assembly according to Example 1, representing deviations of focal points converged by light of different wavelengths which passes through the lens assembly. FIG. 2B illustrates an astigmatic curve of the optical imaging lens assembly according to Example 1, representing a curvature of a tangential image plane and a curvature of a sagittal image plane. FIG. 2C illustrates a distortion curve of the optical imaging lens assembly according to Example 1, representing amounts of distortion corresponding to different image heights. FIG. 2D illustrates a lateral color curve of the optical imaging lens assembly according to Example 1, representing deviations of different image heights on the image plane formed by light passing through the lens assembly. It can be seen from FIGS. 2A-2D that the optical imaging lens assembly given in Example 1 can achieve a good imaging quality.

image-side surface S12. Light from an object sequentially passes through the surfaces S1-S12 and finally forms an image on the image plane S13.

In this example, a total effective focal length of the optical imaging lens assembly is f=3.22 mm, and a distance from the object-side surface S1 of the first lens E1 to the image plane S13 on the optical axis is TTL=3.80 mm. A half of a diagonal length of an effective pixel area on the image plane S13 is ImgH=3.01 mm. A half of a maximal field-of-view of the optical imaging lens assembly is Semi-FOV=42.1°, and a f-number of the optical imaging lens assembly is Fno=2.38.

Table 3 is a table showing basic parameters of the optical imaging lens assembly in Example 2. Here, the units of a radius of curvature, a thickness/distance and a focal length are millimeters (mm).

TABLE 3

| surface number | surface type | radius of curvature | thickness/distance | material refractive index | abbe number | focal length | conic coefficient |
|---|---|---|---|---|---|---|---|
| OBJ | spherical | infinite | 315.0000 | | | | |
| STO | spherical | infinite | −0.1784 | | | | |
| S1 | aspheric | 1.3073 | 0.5736 | 1.55 | 56.1 | 2.58 | −0.9700 |
| S2 | aspheric | 15.0822 | 0.0385 | | | | 41.4839 |
| S3 | aspheric | −2147.43 | 0.2293 | 1.68 | 19.2 | −6.33 | −99.0000 |
| S4 | aspheric | 4.2968 | 0.2803 | | | | −10.3321 |
| S5 | aspheric | −12.4086 | 0.3627 | 1.55 | 56.1 | −10.35 | 99.0000 |
| S6 | aspheric | 10.4750 | 0.2704 | | | | 94.1903 |
| S7 | aspheric | 3.5329 | 0.4100 | 1.55 | 56.1 | 3.20 | −1.2704 |
| S8 | aspheric | −3.3187 | 0.6190 | | | | −3.5014 |
| S9 | aspheric | 2.6573 | 0.3030 | 1.54 | 55.9 | −2.53 | −99.0000 |
| S10 | aspheric | 0.8624 | 0.2711 | | | | −8.3722 |
| S11 | spherical | infinite | 0.0976 | 1.52 | 64.2 | | |
| S12 | spherical | infinite | 0.3395 | | | | |
| S13 | spherical | infinite | | | | | |

In Example 2, the object-side surface and the image-side surface of any lens in the first to fifth lenses E1-E5 are both aspheric surfaces. Table 4 below shows the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S10 in Example 2.

TABLE 4

| surface number | A4 | A6 | A8 | A10 | A12 | A14 | A16 | A18 | A20 |
|---|---|---|---|---|---|---|---|---|---|
| S1 | 2.1647E−02 | 5.4234E−01 | −6.3357E+00 | 4.4949E+01 | −2.0314E+02 | 5.8390E+02 | −1.0371E+03 | 1.0371E+03 | −4.4724E+02 |
| S2 | −2.6818E−01 | 7.9846E−01 | −5.7387E+00 | 4.3086E+01 | −2.3568E+02 | 7.5895E+02 | −1.3827E+03 | 1.3202E+03 | −5.1039E+02 |
| S3 | −1.7545E−01 | 1.5771E−01 | 4.7934E+00 | −3.3075E+01 | 9.2086E+01 | −1.0166E+02 | −3.5672E+01 | 1.7677E+02 | −1.1008E+02 |
| S4 | −3.1701E−02 | 1.0436E+00 | −8.4007E+00 | 6.0362E+01 | −2.8730E+02 | 8.4592E+02 | −1.4856E+03 | 1.4299E+03 | −5.8073E+02 |
| S5 | −5.2201E−01 | 1.8271E+00 | −1.3684E+01 | 7.7276E+01 | −3.1282E+02 | 8.4351E+02 | −1.4312E+03 | 1.3708E+03 | −5.6120E+02 |
| S6 | −6.4790E−01 | 1.8419E+00 | −8.4782E+00 | 2.9029E+01 | −6.9599E+01 | 1.1121E+02 | −1.1198E+02 | 6.4004E+01 | −1.5628E+01 |
| S7 | −3.1412E−01 | 7.2254E−01 | −1.8192E+00 | 3.2320E+00 | −4.1000E+00 | 3.5487E+00 | −1.9883E+00 | 6.4676E−01 | −9.1402E−02 |
| S8 | −1.6224E−01 | 4.8712E−01 | −8.5761E−01 | 1.1049E+00 | −9.7726E−01 | 5.5710E−01 | −1.9382E−01 | 3.7326E−02 | −3.0449E−03 |
| S9 | −8.3536E−01 | 9.2793E−01 | −6.5186E−01 | 3.3224E−01 | −1.1889E−01 | 2.8446E−02 | −4.2995E−03 | 3.7035E−04 | −1.3854E−05 |
| S10 | −3.1788E−01 | 2.8460E−01 | −1.7305E−01 | 7.1562E−02 | −1.9986E−02 | 3.5972E−03 | −3.8765E−04 | 2.2127E−05 | −4.9839E−07 |

Figure 4A:
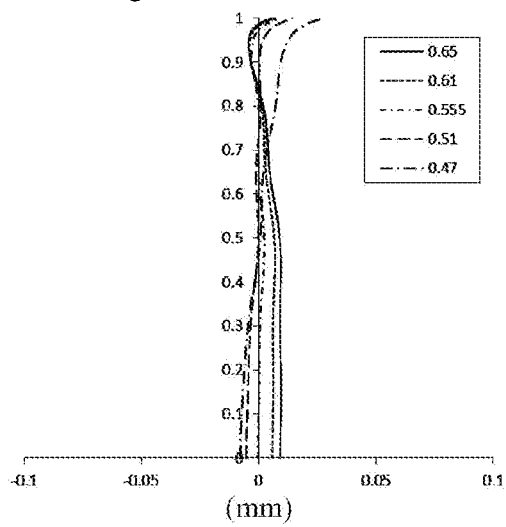
FIGS. 4A-4D respectively illustrate a longitudinal aberration curve, an astigmatic curve, a distortion curve and a lateral color curve of the optical imaging lens assembly according to Example 2.
Figure 4B:
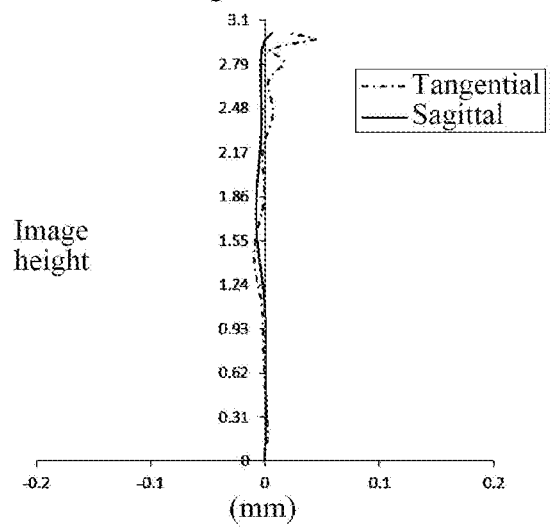
Figure 4C:
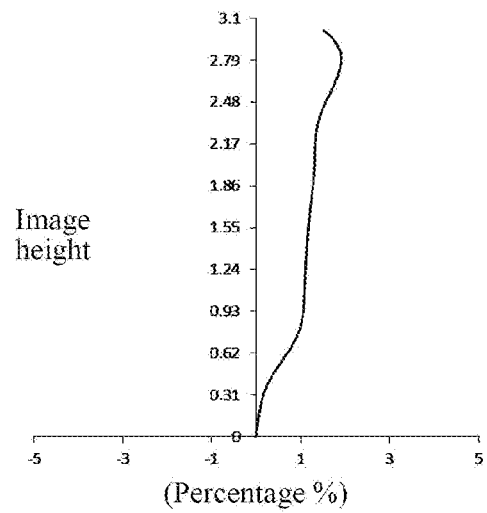
Figure 4D:
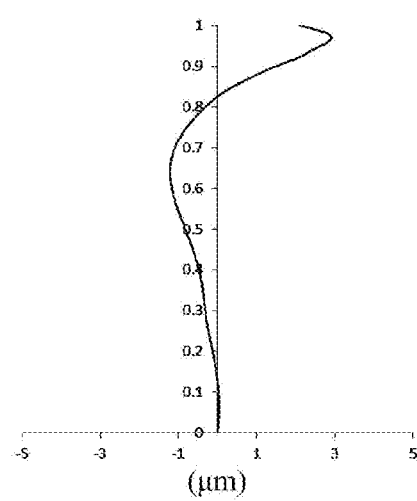

FIG. 4A illustrates a longitudinal aberration curve of the optical imaging lens assembly according to Example 2, representing deviations of focal points converged by light of different wavelengths which passes through the lens assembly. FIG. 4B illustrates an astigmatic curve of the optical imaging lens assembly according to Example 2, representing a curvature of a tangential image plane and a curvature of a sagittal image plane. FIG. 4C illustrates a distortion curve of the optical imaging lens assembly according to Example 2, representing amounts of distortion corresponding to different image heights. FIG. 4D illustrates a lateral color curve of the optical imaging lens assembly according to Example 2, representing deviations of different image heights on the image plane formed by light passing through the lens assembly. It can be seen from FIGS. 4A-4D that the optical imaging lens assembly given in Example 2 can achieve a good imaging quality.

Example 3

Figure 5:
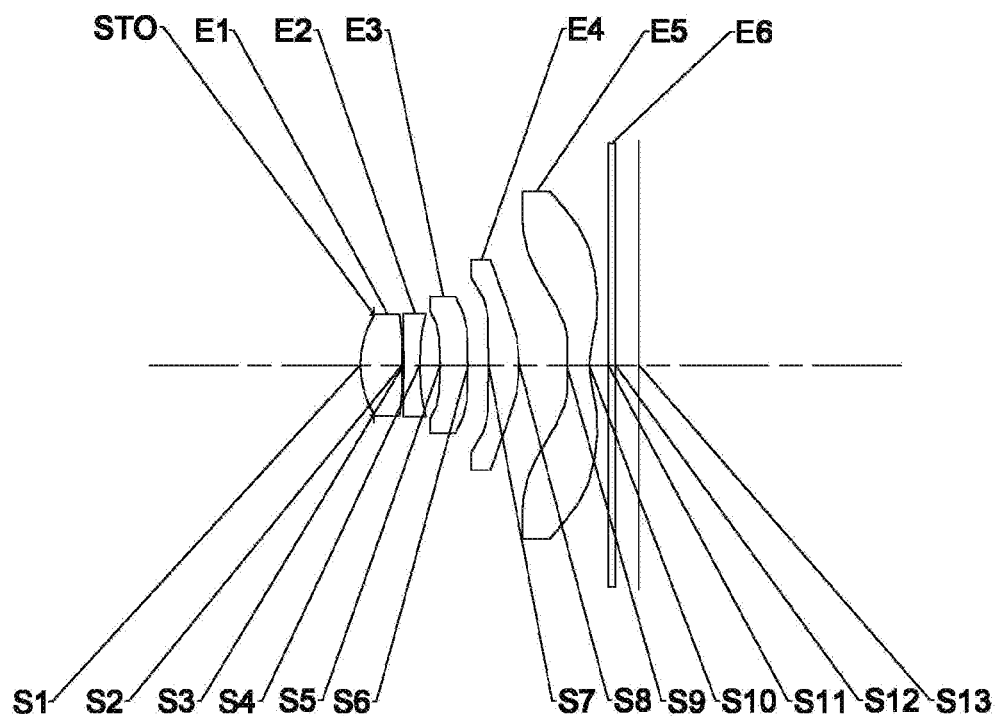
FIG. 5 is a schematic structural diagram of an optical imaging lens assembly according to Example 3 of the present disclosure.

An optical imaging lens assembly according to Example 3 of the present disclosure is described below with reference to FIGS. 5-6D. FIG. 5 is a schematic structural diagram of the optical imaging lens assembly according to Example 3 of the present disclosure.

As shown in FIG. 5, the optical imaging lens assembly includes, sequentially along an optical axis from an object side to an image side, a diaphragm STO, a first lens E1, a second lens E2, a third lens E3, a fourth lens E4, a fifth lens E5, an optical filter E6 and an image plane S13.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a negative refractive power, an object-side surface S5 of the third lens E3 is a concave surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The optical filter E6 has an object-side surface S11 and an image-side surface S12. Light from an object sequentially passes through the surfaces S1-S12 and finally forms an image on the image plane S13.

In this example, a total effective focal length of the optical imaging lens assembly is f=3.22 mm, and a distance from the object-side surface S1 of the first lens E1 to the image plane S13 on the optical axis is TTL=3.78 mm. A half of a diagonal length of an effective pixel area on the image plane S13 is ImgH=3.02 mm. A half of a maximal field-of-view of the optical imaging lens assembly is Semi-FOV=42.1°, and a f-number of the optical imaging lens assembly is Fno=2.38.

Table 5 is a table showing basic parameters of the optical imaging lens assembly in Example 3. Here, the units of a radius of curvature, a thickness/distance and a focal length are millimeters (mm).

TABLE 5

| surface number | surface type | radius of curvature | thickness/ distance | material refractive index | abbe number | focal length | conic coefficient |
|---|---|---|---|---|---|---|---|
| OBJ | spherical | infinite | 310.0000 | | | | |
| STO | spherical | infinite | −0.1831 | | | | |
| S1 | aspheric | 1.2837 | 0.5676 | 1.55 | 56.1 | 2.48 | −0.9468 |
| S2 | aspheric | 21.3308 | 0.0181 | | | | −99.0000 |
| S3 | aspheric | 62.5783 | 0.2200 | 1.68 | 19.2 | −6.11 | 99.0000 |
| S4 | aspheric | 3.8783 | 0.2777 | | | | −6.8025 |
| S5 | aspheric | −10.1766 | 0.3753 | 1.55 | 56.1 | −10.75 | 61.5041 |
| S6 | aspheric | 14.0558 | 0.2802 | | | | 99.0000 |
| S7 | aspheric | 6.8824 | 0.4150 | 1.55 | 56.1 | 3.28 | 11.1084 |
| S8 | aspheric | −2.3690 | 0.6442 | | | | −0.9917 |
| S9 | aspheric | 2.5765 | 0.3000 | 1.54 | 55.9 | −2.32 | −99.0000 |
| S10 | aspheric | 0.8064 | 0.2618 | | | | −8.6287 |
| S11 | spherical | infinite | 0.0976 | 1.52 | 64.2 | | |
| S12 | spherical | infinite | 0.3176 | | | | |
| S13 | spherical | infinite | | | | | |

In Example 3, the object-side surface and the image-side surface of any lens in the first to fifth lenses E1-E5 are both aspheric surfaces. Table 6 below shows the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S10 in Example 3.

TABLE 6

| surface number | A4 | A6 | A8 | A10 | A12 | A14 | A16 | A18 | A20 |
|---|---|---|---|---|---|---|---|---|---|
| S1 | 2.8953E−02 | 4.1887E−01 | −4.7471E+00 | 3.2965E+01 | −1.4716E+02 | 4.1993E+02 | −7.4435E+02 | 7.4578E+02 | −3.2366E+02 |
| S2 | −4.6434E−01 | 1.4510E+00 | 6.6284E−01 | −1.7671E+01 | 1.0160E+01 | 1.6579E+02 | −4.7682E+02 | 4.9170E+02 | −1.6257E+02 |
| S3 | −3.3734E−01 | 7.3914E−01 | 1.0836E+01 | −9.2062E+01 | 3.3863E+02 | −7.1106E+02 | 9.0261E+02 | −6.7135E+02 | 2.3567E+02 |
| S4 | −4.1042E−02 | 1.2679E+00 | −1.0723E+01 | 7.9111E+01 | −3.8805E+02 | 1.1828E+03 | −2.1565E+03 | 2.1626E+03 | −9.2025E+02 |
| S5 | −5.0380E−01 | 2.1955E+00 | −2.0937E+01 | 1.4055E+02 | −6.4065E+02 | 1.8893E+03 | −3.4446E+03 | 3.5158E+03 | −1.5289E+03 |
| S6 | −5.7019E−01 | 1.7648E+00 | −8.4402E+00 | 2.9794E+01 | −7.3674E+01 | 1.2140E+02 | −1.2621E+02 | 7.4801E+01 | −1.9060E+01 |
| S7 | −4.1275E−01 | 9.6118E−01 | −2.9010E+00 | 6.7433E+00 | −1.0700E+01 | 1.1045E+01 | −7.1519E+00 | 2.6402E+00 | −4.2078E−01 |
| S8 | −2.9825E−01 | 7.9548E−01 | −1.8338E+00 | 3.2714E+00 | −3.6277E+00 | 2.4372E+00 | −9.7550E−01 | 2.1505E−01 | −2.0160E−02 |
| S9 | −1.0894E+00 | 1.4861E+00 | −1.1775E+00 | 6.1375E−01 | −2.1364E−01 | 4.9078E−02 | −7.1452E−03 | 5.9789E−04 | −2.1925E−05 |
| S10 | −4.1651E−01 | 4.5041E−01 | −2.9723E−01 | 1.2900E−01 | −3.7829E−02 | 7.3722E−03 | −9.1073E−04 | 6.4552E−05 | −2.0050E−06 |

Figures 6A, 6B:
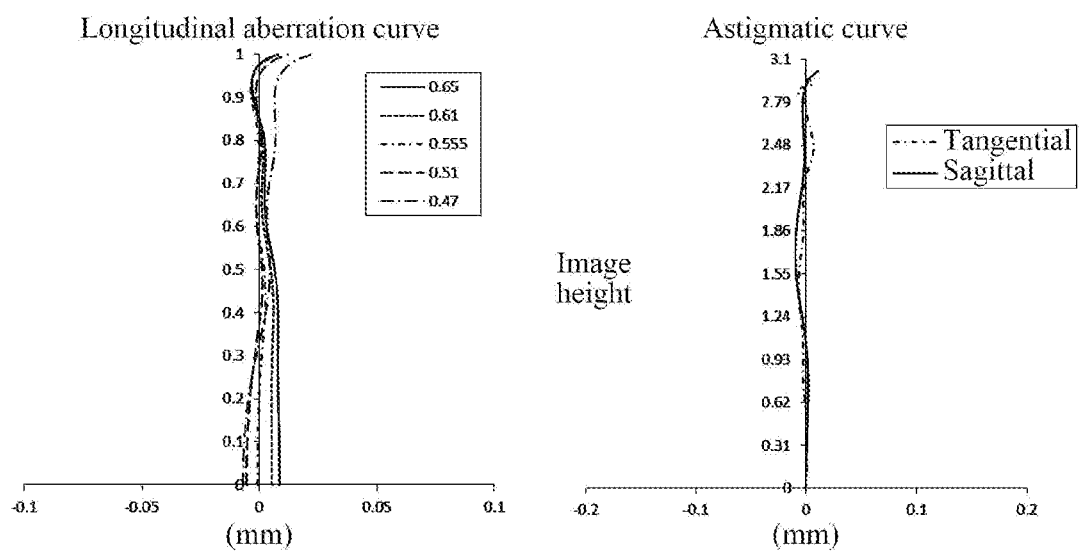
FIGS. 6A-6D respectively illustrate a longitudinal aberration curve, an astigmatic curve, a distortion curve and a lateral color curve of the optical imaging lens assembly according to Example 3.
Figure 6C:
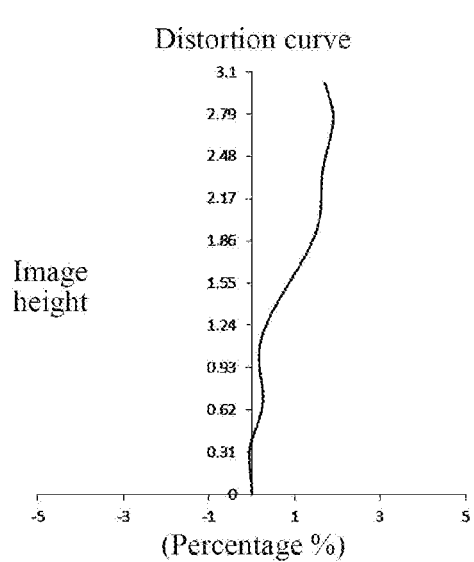
Figure 6D:
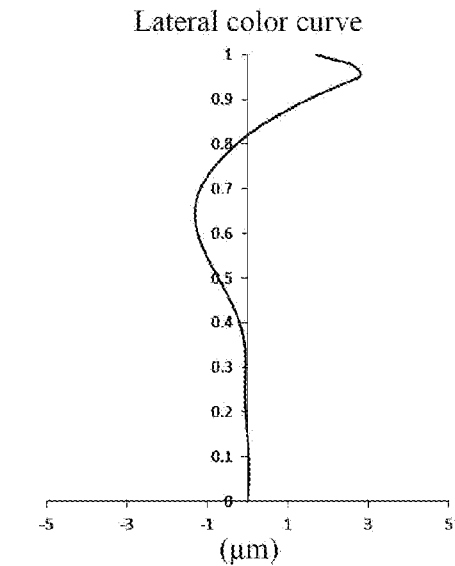

FIG. 6A illustrates a longitudinal aberration curve of the optical imaging lens assembly according to Example 3, representing deviations of focal points converged by light of different wavelengths which passes through the lens assembly. FIG. 6B illustrates an astigmatic curve of the optical imaging lens assembly according to Example 3, representing a curvature of a tangential image plane and a curvature of a sagittal image plane. FIG. 6C illustrates a distortion curve of the optical imaging lens assembly according to Example 3, representing amounts of distortion corresponding to different image heights. FIG. 6D illustrates a lateral color curve of the optical imaging lens assembly according to Example 3, representing deviations of different image heights on the image plane formed by light passing through the lens assembly. It can be seen from FIGS. 6A-6D that the optical imaging lens assembly given in Example 3 can achieve a good imaging quality.

Example 4

Figure 7:
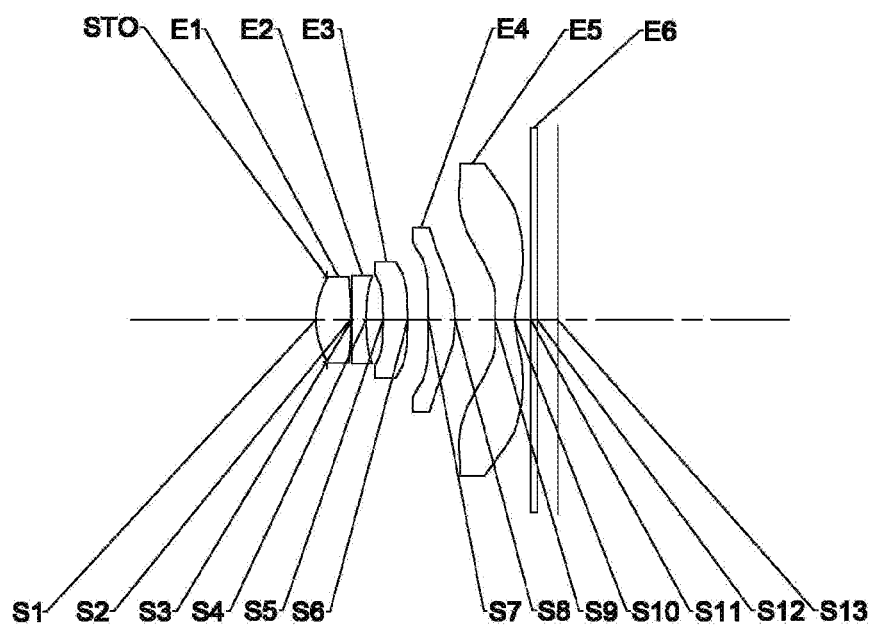
FIG. 7 is a schematic structural diagram of an optical imaging lens assembly according to Example 4 of the present disclosure.

An optical imaging lens assembly according to Example 4 of the present disclosure is described below with reference to FIGS. 7-8D. FIG. 7 is a schematic structural diagram of the optical imaging lens assembly according to Example 4 of the present disclosure.

As shown in FIG. 7, the optical imaging lens assembly includes, sequentially along an optical axis from an object side to an image side, a diaphragm STO, a first lens E1, a second lens E2, a third lens E3, a fourth lens E4, a fifth lens E5, an optical filter E6 and an image plane S13.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a negative refractive power, an object-side surface S5 of the third lens E3 is a concave surface, and an image-side surface S6 of the third lens E3 is a convex surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The optical filter E6 has an object-side surface S11 and an image-side surface S12. Light from an object sequentially passes through the surfaces S1-S12 and finally forms an image on the image plane S13.

In this example, a total effective focal length of the optical imaging lens assembly is f=3.12 mm, and a distance from the object-side surface S1 of the first lens E1 to the image plane S13 on the optical axis is TTL=3.75 mm. A half of a diagonal length of an effective pixel area on the image plane S13 is ImgH=3.01 mm. A half of a maximal field-of-view of the optical imaging lens assembly is Semi-FOV=43.0°, and a f-number of the optical imaging lens assembly is Fno=2.37.

Table 7 is a table showing basic parameters of the optical imaging lens assembly in Example 4. Here, the units of a radius of curvature, a thickness/distance and a focal length are millimeters (mm).

TABLE 7

| surface number | surface type | radius of curvature | thickness/ distance | material refractive index | abbe number | focal length | conic coefficient |
|---|---|---|---|---|---|---|---|
| OBJ | spherical | infinite | 308.0000 | | | | |
| STO | spherical | infinite | −0.1747 | | | | |
| S1 | aspheric | 1.2800 | 0.5307 | 1.55 | 56.1 | 2.55 | −0.8883 |
| S2 | aspheric | 13.3894 | 0.0253 | | | | 95.7395 |
| S3 | aspheric | 19.4665 | 0.2200 | 1.68 | 19.2 | −5.89 | −99.0000 |
| S4 | aspheric | 3.2966 | 0.2627 | | | | −7.3175 |
| S5 | aspheric | −12.7982 | 0.3846 | 1.55 | 56.1 | −23.85 | 36.2430 |
| S6 | aspheric | −762.7494 | 0.3226 | | | | −99.0000 |
| S7 | aspheric | 10.8005 | 0.4124 | 1.55 | 56.1 | 3.37 | 23.0989 |
| S8 | aspheric | −2.1846 | 0.6152 | | | | −1.3833 |
| S9 | aspheric | 2.4383 | 0.3000 | 1.54 | 55.9 | −2.35 | −92.8461 |
| S10 | aspheric | 0.7954 | 0.2584 | | | | −8.0302 |
| S11 | spherical | infinite | 0.0976 | 1.52 | 64.2 | | |
| S12 | spherical | infinite | 0.3157 | | | | |
| S13 | spherical | infinite | | | | | |

In Example 4, the object-side surface and the image-side surface of any lens in the first to fifth lenses E1-E5 are both aspheric surfaces. Table 8 below shows the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S10 in Example 4.

TABLE 8

| surface number | A4 | A6 | A8 | A10 | A12 | A14 | A16 | A18 | A20 |
|---|---|---|---|---|---|---|---|---|---|
| S1 | 2.9009E−02 | 4.9258E−01 | −6.0132E+00 | 4.5291E+01 | −2.1738E+02 | 6.6508E+02 | −1.2601E+03 | 1.3459E+03 | −6.2047E+02 |
| S2 | −4.0109E−01 | 1.7526E+00 | −9.4089E+00 | 7.2960E+01 | −4.5813E+02 | 1.7131E+03 | −3.6899E+03 | 4.2711E+03 | −2.0637E+03 |
| S3 | −3.1577E−01 | 1.1843E+00 | 7.6551E−01 | −9.6663E+00 | −5.2798E+01 | 4.8456E+02 | −1.4343E+03 | 1.9745E+03 | −1.0683E+03 |
| S4 | −4.2621E−02 | 1.0367E+00 | −6.3668E+00 | 4.1409E+01 | −2.0025E+02 | 6.2311E+02 | −1.1745E+03 | 1.2247E+03 | −5.4205E+02 |
| S5 | −4.3408E−01 | 1.3899E+00 | −1.1275E+01 | 6.5471E+01 | −2.7446E+02 | 7.7361E+02 | −1.3825E+03 | 1.3986E+03 | −6.0461E+02 |
| S6 | −4.6290E−01 | 1.3428E+00 | −6.7644E+00 | 2.4507E+01 | −6.1365E+01 | 1.0095E+02 | −1.0334E+02 | 5.9365E+01 | −1.4373E+01 |
| S7 | −3.4195E−01 | 7.9685E−01 | −2.4182E+00 | 5.3881E+00 | −8.0085E+00 | 7.6874E+00 | −4.6103E+00 | 1.5714E+00 | −2.3074E−01 |
| S8 | −2.6900E−01 | 7.2362E−01 | −1.6372E+00 | 2.7537E+00 | −2.8463E+00 | 1.7796E+00 | −6.6258E−01 | 1.3572E−01 | −1.1793E−02 |
| S9 | −9.4066E−01 | 1.1699E+00 | −8.3758E−01 | 3.9398E−01 | −1.2373E−01 | 2.5622E−02 | −3.3573E−03 | 2.5228E−04 | −8.2858E−06 |
| S10 | −3.3175E−01 | 3.2018E−01 | −1.9118E−01 | 7.4727E−02 | −1.9472E−02 | 3.2891E−03 | −3.3937E−04 | 1.9121E−05 | −4.4224E−07 |

Figure 8A:
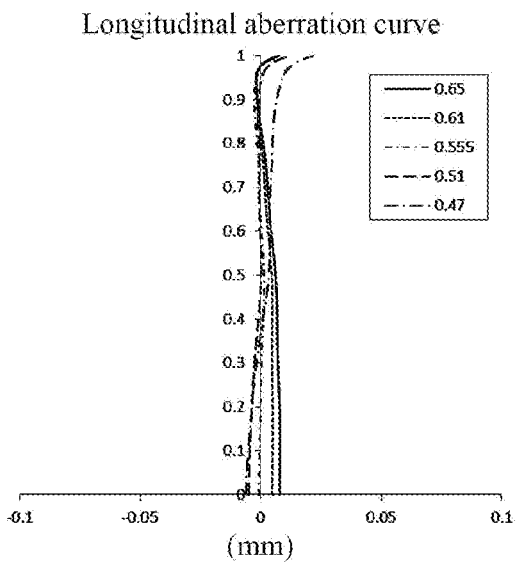
FIGS. 8A-8D respectively illustrate a longitudinal aberration curve, an astigmatic curve, a distortion curve and a lateral color curve of the optical imaging lens assembly according to Example 4.
Figure 8B:
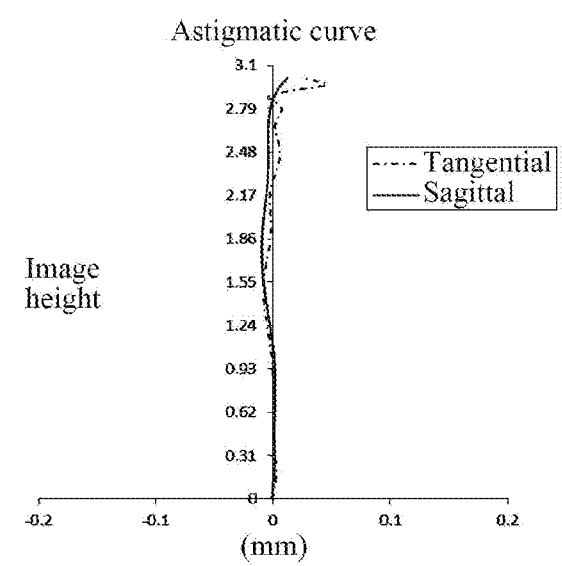
Figure 8C:
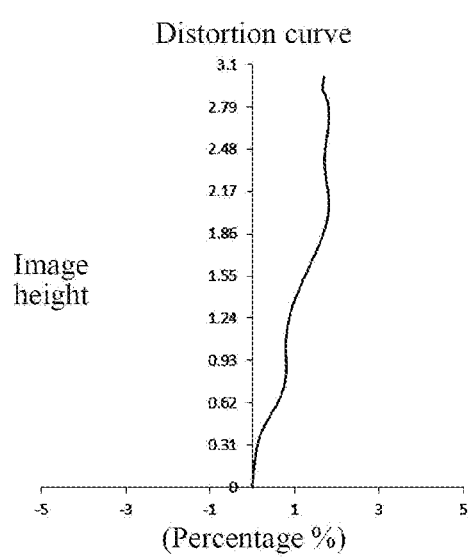
Figure 8D:
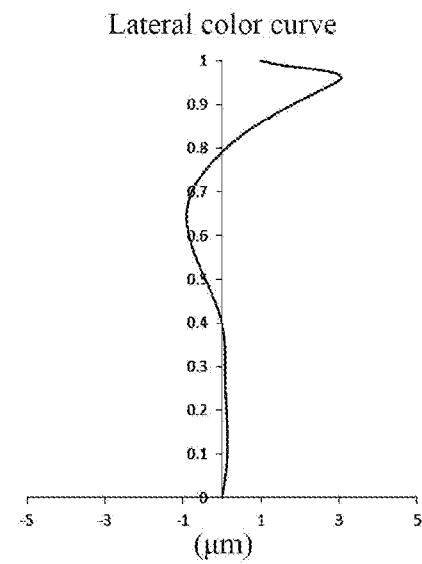

FIG. 8A illustrates a longitudinal aberration curve of the optical imaging lens assembly according to Example 4, representing deviations of focal points converged by light of different wavelengths which passes through the lens assembly. FIG. 8B illustrates an astigmatic curve of the optical imaging lens assembly according to Example 4, representing a curvature of a tangential image plane and a curvature of a sagittal image plane. FIG. 8C illustrates a distortion curve of the optical imaging lens assembly according to Example 4, representing amounts of distortion corresponding to different image heights. FIG. 8D illustrates a lateral color curve of the optical imaging lens assembly according to Example 4, representing deviations of different image heights on the image plane formed by light passing through the lens assembly. It can be seen from FIGS. 8A-8D that the optical imaging lens assembly given in Example 4 can achieve a good imaging quality.

Example 5

Figure 9:
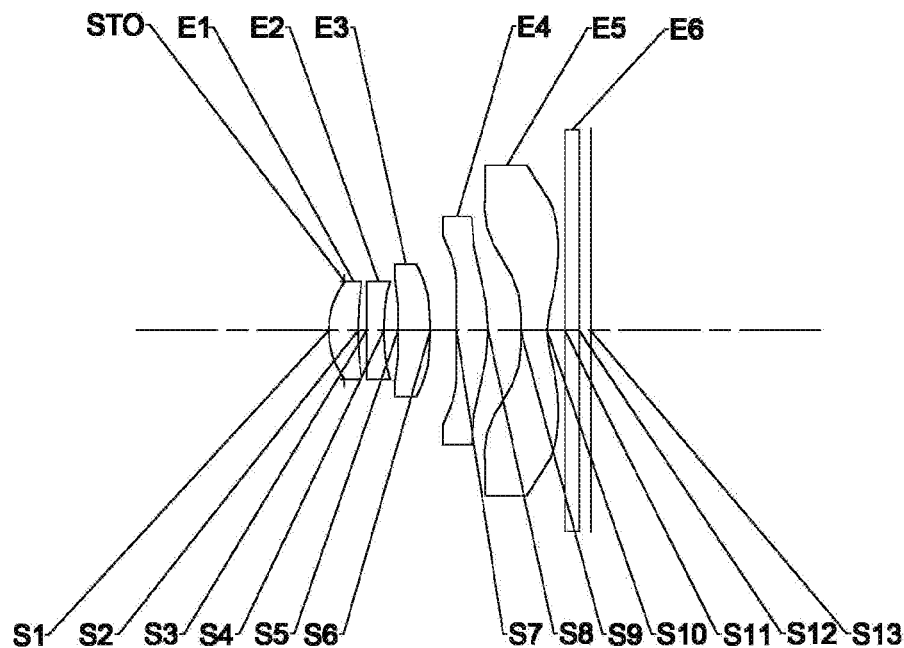
FIG. 9 is a schematic structural diagram of an optical imaging lens assembly according to Example 5 of the present disclosure.

An optical imaging lens assembly according to Example 5 of the present disclosure is described below with reference to FIGS. 9-10D. FIG. 9 is a schematic structural diagram of the optical imaging lens assembly according to Example 5 of the present disclosure.

As shown in FIG. 9, the optical imaging lens assembly includes, sequentially along an optical axis from an object side to an image side, a diaphragm STO, a first lens E1, a second lens E2, a third lens E3, a fourth lens E4, a fifth lens E5, an optical filter E6 and an image plane S13.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The optical filter E6 has an object-side surface S11 and an image-side surface S12. Light from an object sequentially passes through the surfaces S1-S12 and finally forms an image on the image plane S13.

In this example, a total effective focal length of the optical imaging lens assembly is f=3.15 mm, and a distance from the object-side surface S1 of the first lens E1 to the image plane S13 on the optical axis is TTL=3.91 mm. A half of a diagonal length of an effective pixel area on the image plane S13 is ImgH=3.01 mm. A half of a maximal field-of-view of the optical imaging lens assembly is Semi-FOV=42.7°, and a f-number of the optical imaging lens assembly is Fno=2.15.

Table 9 is a table showing basic parameters of the optical imaging lens assembly in Example 5. Here, the units of a radius of curvature, a thickness/distance and a focal length are millimeters (mm).

TABLE 9

| surface number | surface type | radius of curvature | thickness/ distance | material refractive index | abbe number | focal length | conic coefficient |
|---|---|---|---|---|---|---|---|
| OBJ | spherical | infinite | 350.0000 | | | | |
| STO | spherical | infinite | −0.2381 | | | | |
| S1 | aspheric | 1.2829 | 0.4383 | 1.55 | 56.1 | 3.05 | −0.4767 |
| S2 | aspheric | 4.8930 | 0.1294 | | | | 36.5374 |
| S3 | aspheric | 15.9160 | 0.2550 | 1.68 | 19.2 | −6.69 | 99.0000 |
| S4 | aspheric | 3.5045 | 0.2113 | | | | −10.0676 |
| S5 | aspheric | 42.0215 | 0.4800 | 1.55 | 56.1 | 10.13 | 85.3733 |
| S6 | aspheric | −6.3410 | 0.3915 | | | | −99.0000 |
| S7 | aspheric | 13.6354 | 0.4704 | 1.55 | 56.1 | 4.46 | −57.6737 |
| S8 | aspheric | −2.9282 | 0.4845 | | | | −2.0526 |
| S9 | aspheric | 7.9932 | 0.3921 | 1.54 | 55.9 | −2.30 | 5.8534 |
| S10 | aspheric | 1.0517 | 0.2702 | | | | −6.8663 |
| S11 | spherical | infinite | 0.2100 | 1.52 | 64.2 | | |
| S12 | spherical | infinite | 0.1724 | | | | |
| S13 | spherical | infinite | | | | | |

In Example 5, the object-side surface and the image-side surface of any lens in the first to fifth lenses E1-E5 are both aspheric surfaces. Table 10 below shows the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S10 in Example 5.

TABLE 10

| surface number | A4 | A6 | A8 | A10 | A12 | A14 | A16 | A18 | A20 |
|---|---|---|---|---|---|---|---|---|---|
| S1 | 3.3815E−02 | 2.2364E−01 | −1.8549E+00 | 1.1814E+01 | −4.6335E+01 | 1.1529E+02 | −1.7596E+02 | 1.5073E+02 | −5.5415E+01 |
| S2 | 7.8575E−02 | −1.1907E−02 | 9.0859E−01 | −8.0322E+00 | 3.9717E+01 | −1.2132E+02 | 2.2225E+02 | −2.2422E+02 | 9.4093E+01 |
| S3 | −1.2754E−01 | 1.5232E−01 | 8.8177E−01 | −9.9441E+00 | 5.4714E+01 | −1.8164E+02 | 3.5595E+02 | −3.7921E+02 | 1.6761E+02 |
| S4 | −5.9160E−02 | 7.9434E−01 | −7.0795E+00 | 5.2202E+01 | −2.3916E+02 | 6.7848E+02 | −1.1585E−03 | 1.0911E−03 | −4.3533E−02 |
| S5 | −1.9371E−01 | 2.8739E−01 | −2.0923E+00 | 1.0526E+01 | −3.5769E+01 | 7.9733E+01 | −1.1116E+02 | 8.9847E+01 | −3.2074E+01 |
| S6 | −2.2971E−01 | 2.8623E−01 | −1.6359E+00 | 6.2517E+00 | −1.5748E+01 | 2.5455E+01 | −2.5274E+01 | 1.4074E+01 | −3.3339E+00 |
| S7 | −6.5981E−02 | −9.3691E−03 | 5.8598E−02 | −1.7880E−01 | 2.5688E−01 | −2.2906E−01 | 1.2442E−01 | −3.5712E−02 | 4.0742E−03 |
| S8 | −4.7595E−02 | 8.0454E−02 | −4.9129E−02 | 4.7637E−02 | −4.4922E−02 | 2.5925E−02 | −8.7242E−03 | 1.5995E−03 | −1.2375E−04 |
| S9 | −7.2129E−02 | 7.4691E−01 | −5.1942E−01 | 2.7754E−01 | −1.0639E−01 | 2.7258E−02 | 4.3873E−03 | 4.0051E−04 | −1.5827E−05 |
| S10 | −2.1949E−01 | 1.8527E−01 | −1.0170E−01 | 3.6325E−02 | −8.2571E−03 | 1.1014E−03 | −7.1374E−05 | 7.1768E−07 | 9.3501E−08 |

Figure 10A:
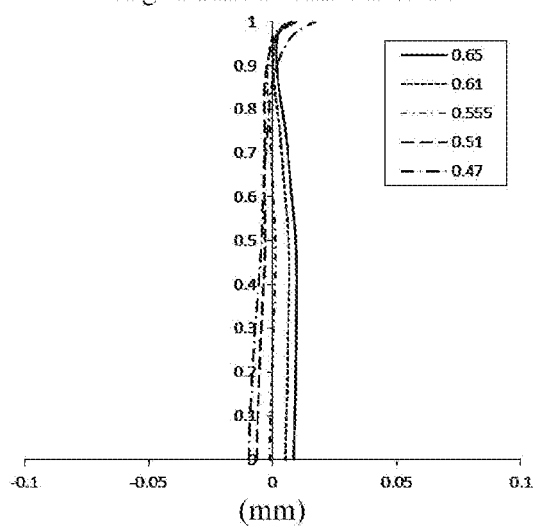
FIGS. 10A-10D respectively illustrate a longitudinal aberration curve, an astigmatic curve, a distortion curve and a lateral color curve of the optical imaging lens assembly according to Example 5.
Figure 10B:
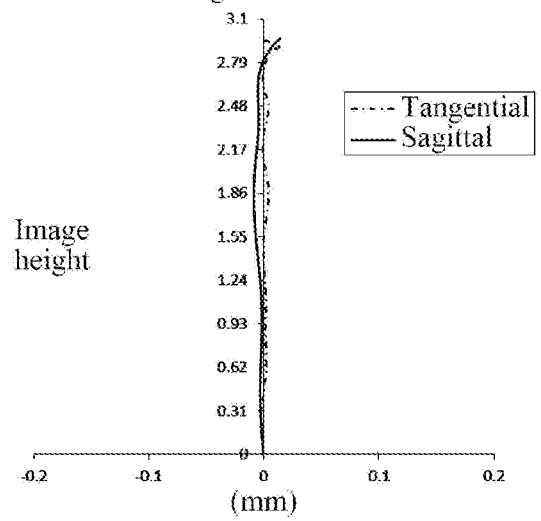
Figures 10C, 10D:
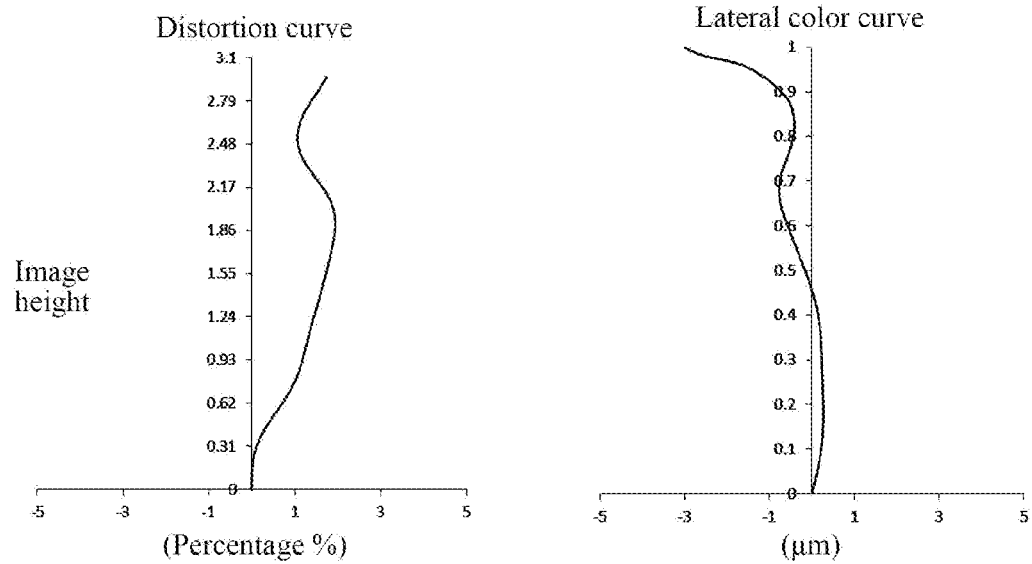

FIG. 10A illustrates a longitudinal aberration curve of the optical imaging lens assembly according to Example 5, representing deviations of focal points converged by light of different wavelengths which passes through the lens assembly. FIG. 10B illustrates an astigmatic curve of the optical imaging lens assembly according to Example 5, representing a curvature of a tangential image plane and a curvature of a sagittal image plane. FIG. 10C illustrates a distortion curve of the optical imaging lens assembly according to Example 5, representing amounts of distortion corresponding to different image heights. FIG. 10D illustrates a lateral color curve of the optical imaging lens assembly according to Example 5, representing deviations of different image heights on the image plane formed by light passing through the lens assembly. It can be seen from FIGS. 10A-10D that the optical imaging lens assembly given in Example 5 can achieve a good imaging quality.

Example 6

Figure 11:
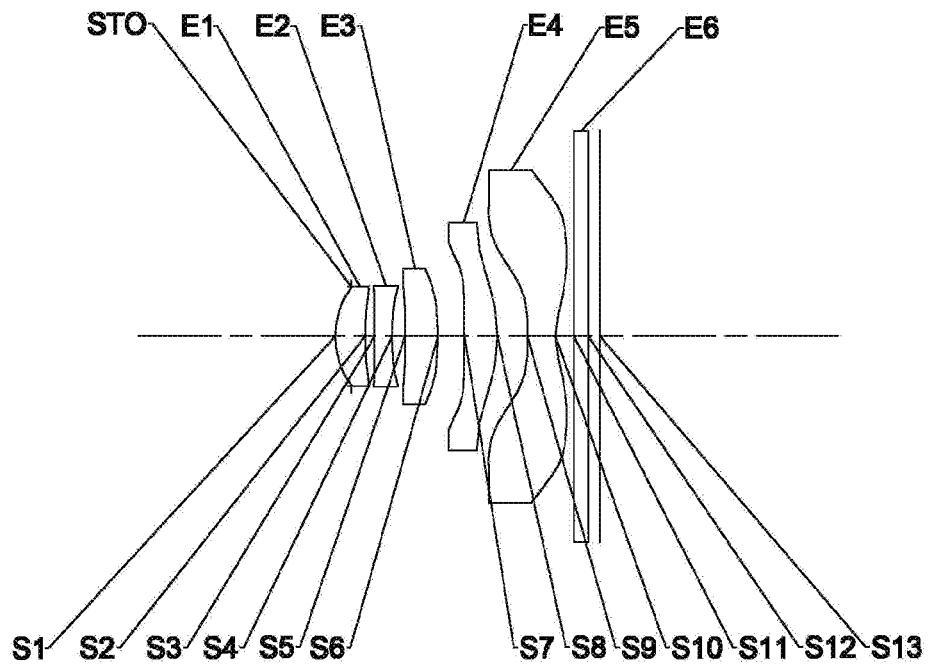
FIG. 11 is a schematic structural diagram of an optical imaging lens assembly according to Example 6 of the present disclosure.

An optical imaging lens assembly according to Example 6 of the present disclosure is described below with reference to FIGS. 11-12D. FIG. 11 is a schematic structural diagram of the optical imaging lens assembly according to Example 6 of the present disclosure.

As shown in FIG. 11, the optical imaging lens assembly includes, sequentially along an optical axis from an object side to an image side, a diaphragm STO, a first lens E1, a second lens E2, a third lens E3, a fourth lens E4, a fifth lens E5, an optical filter E6 and an image plane S13.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The optical filter E6 has an object-side surface S11 and an image-side surface S12. Light from an object sequentially passes through the surfaces S1-S12 and finally forms an image on the image plane S13.

In this example, a total effective focal length of the optical imaging lens assembly is f=3.10 mm, and a distance from the object-side surface S1 of the first lens E1 to the image plane S13 on the optical axis is TTL=3.86 mm. A half of a diagonal length of an effective pixel area on the image plane S13 is ImgH=3.01 mm. Half of a maximal field-of-view of the optical imaging lens assembly is Semi-FOV=43.2°, and a f-number of the optical imaging lens assembly is Fno=2.15.

Table 11 is a table showing basic parameters of the optical imaging lens assembly in Example 6. Here, the units of a radius of curvature, a thickness/distance and a focal length are millimeters (mm).

TABLE 11

| surface number | surface type | radius of curvature | thickness/ distance | refractive index | abbe number | focal length | conic coefficient |
|---|---|---|---|---|---|---|---|
| OBJ | spherical | infinite | 350.0000 | | | | |
| STO | spherical | infinite | −0.2356 | | | | |
| S1 | aspheric | 1.2654 | 0.4341 | 1.55 | 56.1 | 3.07 | −0.4344 |
| S2 | aspheric | 4.5271 | 0.1378 | | | | 34.0680 |
| S3 | aspheric | 16.8039 | 0.2550 | 1.68 | 19.2 | −6.72 | −9.9555 |
| S4 | aspheric | 3.5604 | 0.1891 | | | | −11.6289 |
| S5 | aspheric | 16.0784 | 0.4800 | 1.55 | 56.1 | 8.71 | 6.5347 |
| S6 | aspheric | −6.6775 | 0.3876 | | | | −96.0978 |
| S7 | aspheric | 28.8217 | 0.4779 | 1.55 | 56.1 | 4.31 | −99.0000 |
| S8 | aspheric | −2.5503 | 0.4367 | | | | −1.2780 |
| S9 | aspheric | 11.6875 | 0.4087 | 1.54 | 55.9 | −2.18 | 13.8431 |
| S10 | aspheric | 1.0523 | 0.2704 | | | | −7.2404 |
| S11 | spherical | infinite | 0.2100 | 1.52 | 64.2 | | |
| S12 | spherical | infinite | 0.1677 | | | | |
| S13 | spherical | infinite | | | | | |

In Example 6, the object-side surface and the image-side surface of any lens in the first to fifth lenses E1-E5 are both aspheric surfaces. Table 12 below shows the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S10 in Example 6.

TABLE 12

| surface number | A4 | A6 | A8 | A10 | A12 | A14 | A16 | A18 | A20 |
|---|---|---|---|---|---|---|---|---|---|
| S1 | 3.3280E−02 | 2.7328E−01 | −2.4994E+00 | 1.6967E+01 | −7.0417E+01 | 1.8401E+02 | −2.9339E+02 | 2.6131E+02 | −9.9502E+01 |
| S2 | −7.7932E−02 | 1.1590E−01 | −1.1247E+00 | 8.3637E+00 | −4.2738E+01 | 1.3923E+02 | −2.8278E+02 | 3.2387E+02 | −1.6211E+02 |
| S3 | −1.2427E−01 | 1.6500E−01 | 4.9044E−01 | −7.9505E+00 | 4.9373E+01 | −1.7756E+02 | 3.6939E+02 | −4.1375E+02 | 1.9106E+02 |
| S4 | −5.3048E−02 | 6.2991E−01 | 4.8811E+00 | 3.4492E+01 | −1.5404E+02 | 4.2849E+02 | −7.1860E+02 | 6.6497E+02 | −2.6066E+02 |
| S5 | −1.7385E−01 | 2.9312E−01 | −2.1601E+00 | 1.1207E+01 | −3.8428E+01 | 8.5160E+01 | −1.1667E+02 | 9.1601E+01 | −3.1691E+01 |
| S6 | −2.0201E−01 | 2.6077E−01 | −1.5774E+00 | 6.0803E+00 | −1.5383E+01 | 2.4996E+01 | −2.4991E+01 | 1.4052E+01 | −3.3704E+00 |
| S7 | −7.2880E−02 | −7.9722E−03 | 3.4847E−02 | −1.5380E−01 | 2.7781E−01 | −3.0259E−01 | 1.9212E−01 | −6.2178E−02 | 7.8517E−03 |
| S8 | −6.5844E−02 | 1.0466E−01 | −9.0231E−02 | 8.8002E−02 | −5.7601E−02 | 2.2536E−02 | −5.4802E−03 | 8.1854E−04 | −5.9198E−05 |
| S9 | −7.5528E−01 | 8.2448E−01 | −6.2502E−01 | 3.6635E−01 | −1.5099E−01 | 4.0782E−02 | −6.8285E−03 | 6.4298E−04 | −2.6060E−05 |
| S10 | −2.1661E−01 | 1.8545E−01 | −1.0420E−01 | 3.8340E−02 | −9.1521E−03 | 1.3499E−03 | −1.1448E−04 | 4.9461E−06 | −8.2308E−08 |

Figure 12A:
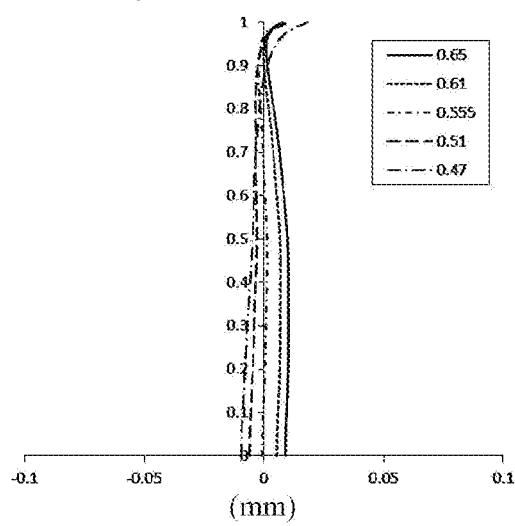
FIGS. 12A-12D respectively illustrate a longitudinal aberration curve, an astigmatic curve, a distortion curve and a lateral color curve of the optical imaging lens assembly according to Example 6.
Figure 12B:
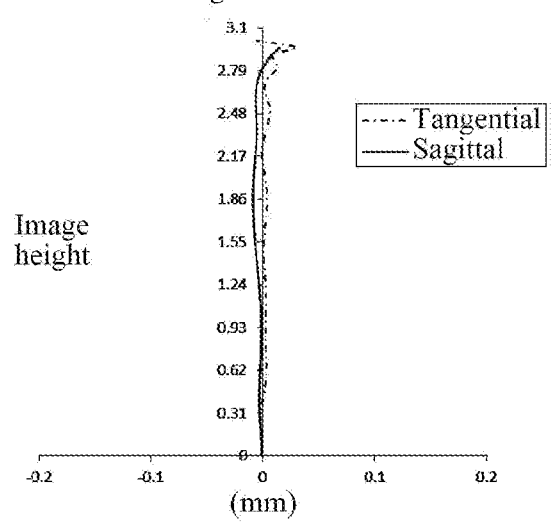
Figure 12C:
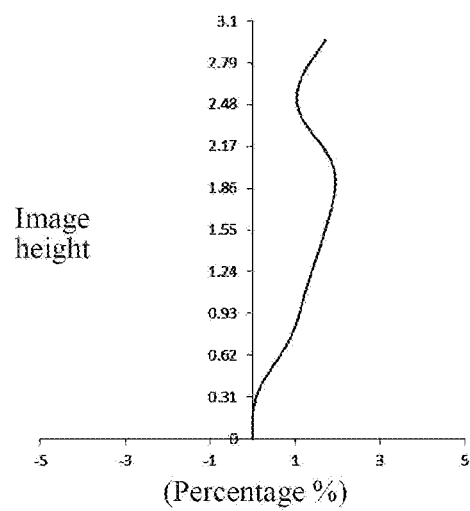
Figure 12D:
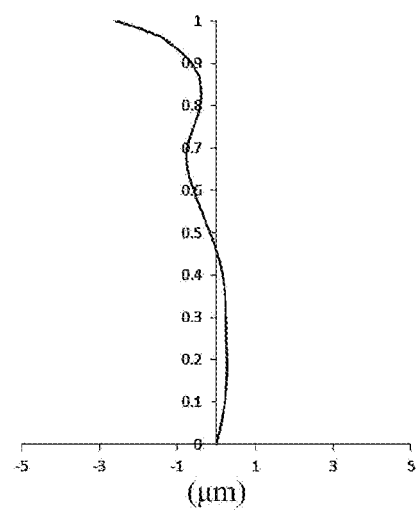

FIG. 12A illustrates a longitudinal aberration curve of the optical imaging lens assembly according to Example 6, representing deviations of focal points converged by light of different wavelengths which passes through the lens assembly. FIG. 12B illustrates an astigmatic curve of the optical imaging lens assembly according to Example 6, representing a curvature of a tangential image plane and a curvature of a sagittal image plane. FIG. 12C illustrates a distortion curve of the optical imaging lens assembly according to Example 6, representing amounts of distortion corresponding to different image heights. FIG. 12D illustrates a lateral color curve of the optical imaging lens assembly according to Example 6, representing deviations of different image heights on the image plane formed by light passing through the lens assembly. It can be seen from FIGS. 12A-12D that the optical imaging lens assembly given in Example 6 can achieve a good imaging quality.

In summary, Example 1-6 respectively satisfy the relationships shown in Table 13.

TABLE 13

| conditional expression/example | 1 | 2 | 3 | 4 | 5 | 6 |
|---|---|---|---|---|---|---|
| TTL/ImgH | 1.27 | 1.26 | 1.25 | 1.24 | 1.30 | 1.28 |
| CT4/T34 | 1.80 | 1.52 | 1.48 | 1.28 | 1.20 | 1.23 |
| R1/f1 | 0.47 | 0.51 | 0.52 | 0.50 | 0.42 | 0.41 |
| f12/f123 | 0.69 | 0.75 | 0.77 | 0.88 | 1.32 | 1.38 |
| \|f/f4\| + \|f/f5\| | 2.33 | 2.28 | 2.37 | 2.26 | 2.07 | 2.14 |
| (R9 + R10)/(R9 − R10) | 1.94 | 1.96 | 1.91 | 1.97 | 1.30 | 1.20 |
| SAG41/SAG51 | 0.31 | 0.32 | 0.39 | 0.46 | 0.38 | 0.42 |
| EPD/ΣCT | 0.68 | 0.72 | 0.72 | 0.71 | 0.72 | 0.70 |
| DT11/DT12 | 0.97 | 0.98 | 0.99 | 0.99 | 1.04 | 1.05 |
| tan(Semi − FoV)/CT5 | 2.98 | 2.98 | 3.01 | 3.10 | 2.36 | 2.29 |
| ΣAT/TD | 0.33 | 0.36 | 0.36 | 0.37 | 0.35 | 0.33 |
| (CT2 + CT3)/(T12 + T23) | 1.81 | 1.86 | 2.01 | 2.10 | 2.16 | 2.25 |

The foregoing is only a description of the preferred examples of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combination of the above technical features or equivalent features thereof without departing from the concept of the invention, such as, technical solutions formed by replacing the features as disclosed in the present disclosure with (but not limited to) technical features with similar functions.

What is claimed is:

1. An optical imaging lens assembly, comprising, sequentially along an optical axis from an object side to an image side:
   a first lens, having a positive refractive power;
   a second lens, having a refractive power;
   a third lens, having a refractive power;
   a fourth lens, having a positive refractive power, wherein an object-side surface of the fourth lens is a convex surface, and an image-side surface of the fourth lens is a convex surface; and
   a fifth lens, having a negative refractive power, wherein an object-side surface of the fifth lens is a convex surface, and an image-side surface of the fifth lens is a concave surface,
   wherein a combined focal length f12 of the first lens and the second lens and a combined focal length f123 of the first lens, the second lens and the third lens satisfy:

$0.5 < f12/f123 < 1.5$.

2. The optical imaging lens assembly according to claim 1, wherein a distance TTL from an object-side surface of the first lens to an image plane of the optical imaging lens assembly on the optical axis and a half of a diagonal length ImgH of an effective pixel area on the image plane of the optical imaging lens assembly satisfy:

$TTL/ImgH \leq 1.3$.

3. The optical imaging lens assembly according to claim 1, wherein a center thickness CT4 of the fourth lens on the optical axis and a spaced interval T34 between the third lens and the fourth lens on the optical axis satisfy:

$CT4/T34 > 1.2$.

4. The optical imaging lens assembly according to claim 1, wherein a radius of curvature R1 of an object-side surface of the first lens and an effective focal length f1 of the first lens satisfy:

$0.2 < R1/f1 < 0.6$.

5. The optical imaging lens assembly according to claim 1, wherein an axial distance SAG41 from an intersection point of the object-side surface of the fourth lens and the optical axis to a vertex of an effective radius of the object-side surface of the fourth lens and an axial distance SAG51 from an intersection point of the object-side surface of the fifth lens and the optical axis to a vertex of an effective radius of the object-side surface of the fifth lens satisfy:

$0.2 < SAG41/SAG51 < 0.8$.

6. The optical imaging lens assembly according to claim 1, wherein a total effective focal length f of the optical imaging lens assembly, an effective focal length f4 of the fourth lens and an effective focal length f5 of the fifth lens satisfy:

$1.8 < |f/f4| + |f/f5| < 2.8$.

7. The optical imaging lens assembly according to claim 1, wherein a radius of curvature R9 of the object-side surface of the fifth lens and a radius of curvature R10 of the image-side surface of the fifth lens satisfy:

$1.0 < (R9+R10)/(R9-R10) < 2.2$.

8. The optical imaging lens assembly according to claim 1, wherein an entrance pupil diameter EPD of the optical imaging lens assembly and a sum ΣCT of center thicknesses of the first lens to the fifth lens on the optical axis satisfy:

$0.3 < EPD/\Sigma CT < 0.9$.

9. The optical imaging lens assembly according to claim 1, wherein a maximal effective radius DT11 of an object-side surface of the first lens and a maximal effective radius DT12 of an image-side surface of the first lens satisfy:

$0.7 < DT11/DT12 < 1.4$.

10. The optical imaging lens assembly according to claim 1, wherein a half of a maximal field-of-view Semi-FOV of the optical imaging lens assembly and a center thickness CT5 of the fifth lens on the optical axis satisfy:

$2.0 \text{ mm}^{-1} < \tan(\text{Semi-FOV})/CT5 < 3.5 \text{ mm}^{-1}$.

11. The optical imaging lens assembly according to claim 1, wherein a sum ΣAT of spaced intervals between any two adjacent lenses in the first lens to the fifth lens on the optical axis and a spaced interval TD between an object-side surface of the first lens and the image-side surface of the fifth lens on the optical axis satisfy:

$0.1 < \Sigma AT/TD < 0.6$.

12. The optical imaging lens assembly according to claim 1, wherein a center thickness CT2 of the second lens on the optical axis, a center thickness CT3 of the third lens on the optical axis, a spaced interval T12 between the first lens and the second lens on the optical axis and a spaced interval T23 between the second lens and the third lens on the optical axis satisfy:

$1.5<(CT2+CT3)/(T12+T23)<2.5.$

13. An optical imaging lens assembly, comprising, sequentially along an optical axis from an object side to an image side:
   a first lens, having a positive refractive power;
   a second lens, having a refractive power;
   a third lens, having a refractive power;
   a fourth lens, having a positive refractive power, wherein an object-side surface of the fourth lens is a convex surface, and an image-side surface of the fourth lens is a convex surface; and
   a fifth lens, having a negative refractive power, wherein an object-side surface of the fifth lens is a convex surface, and an image-side surface of the fifth lens is a concave surface,
   wherein a distance TTL from an object-side surface of the first lens to an image plane of the optical imaging lens assembly on the optical axis and a half of a diagonal length ImgH of an effective pixel area on the image plane of the optical imaging lens assembly satisfy: TTL/ImgH≤1.3, and
   a center thickness CT4 of the fourth lens on the optical axis and a spaced interval T34 between the third lens and the fourth lens on the optical axis satisfy:

$CT4/T34>1.2.$

14. The optical imaging lens assembly according to claim 13, wherein an entrance pupil diameter EPD of the optical imaging lens assembly and a sum ΣCT of center thicknesses of the first lens to the fifth lens on the optical axis satisfy:

$0.3<EPD/\Sigma CT<0.9.$

15. The optical imaging lens assembly according to claim 13, wherein a radius of curvature R1 of the object-side surface of the first lens and an effective focal length f1 of the first lens satisfy:

$0.2<R1/f1<0.6.$

16. The optical imaging lens assembly according to claim 13, wherein an axial distance SAG41 from an intersection point of the object-side surface of the fourth lens and the optical axis to a vertex of an effective radius of the object-side surface of the fourth lens and an axial distance SAG51 from an intersection point of the object-side surface of the fifth lens and the optical axis to a vertex of an effective radius of the object-side surface of the fifth lens satisfy:

$0.2<SAG41/SAG51<0.8.$

17. The optical imaging lens assembly according to claim 13, wherein a total effective focal length f of the optical imaging lens assembly, an effective focal length f4 of the fourth lens and an effective focal length f5 of the fifth lens satisfy:

$1.8<|f/f4|+|f/f5|<2.8.$

18. The optical imaging lens assembly according to claim 13, wherein a radius of curvature R9 of the object-side surface of the fifth lens and a radius of curvature R10 of the image-side surface of the fifth lens satisfy:

$1.0<(R9+R10)/(R9-R10)<2.2.$

19. The optical imaging lens assembly according to claim 13, wherein a maximal effective radius DT11 of the object-side surface of the first lens and a maximal effective radius DT12 of an image-side surface of the first lens satisfy:

$0.7<DT11/DT12<1.4.$

20. The optical imaging lens assembly according to claim 13, wherein a half of a maximal field-of-view Semi-FOV of the optical imaging lens assembly and a center thickness CT5 of the fifth lens on the optical axis satisfy:

$2.0 \text{ mm}^{-1}<\tan(\text{Semi-FOV})/CT5<3.5 \text{ mm}^{-1}.$

* * * * *